US010065654B2

(12) United States Patent
Nishi (10) Patent No.: US 10,065,654 B2
(45) Date of Patent: *Sep. 4, 2018

(54) ONLINE LEARNING AND VEHICLE CONTROL METHOD BASED ON REINFORCEMENT LEARNING WITHOUT ACTIVE EXPLORATION

(71) Applicant: Toyota Motor Engineering & Manufacturing North America, Inc., Erlanger, KY (US)

(72) Inventor: Tomoki Nishi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,558

(22) Filed: Jul. 8, 2016

(65) Prior Publication Data

US 2018/0009445 A1    Jan. 11, 2018

(51) Int. Cl.
*G05D 1/00* (2006.01)
*B60W 50/06* (2006.01)
(Continued)

(52) U.S. Cl.
CPC ......... *B60W 50/06* (2013.01); *G05B 13/0265* (2013.01); *G05B 13/041* (2013.01);
(Continued)

(58) Field of Classification Search
CPC ............. H04W 52/0261; H04W 52/38; H04W 76/041; H04W 88/16; G01C 21/3484;
(Continued)

(56) References Cited

U.S. PATENT DOCUMENTS 6,169,981 B1 * 1/2001 Werbos .............. G05B 13/0265
706/15
6,411,871 B1  6/2002 Lin
(Continued)

OTHER PUBLICATIONS

Fairbank, "Value-gradient Learning", PhD thesis, City University London, 2014, 273 pgs.
(Continued)

*Primary Examiner* — Jelani A Smith
*Assistant Examiner* — Luis A Martinez Borrero
(74) *Attorney, Agent, or Firm* — Christopher G. Darrow; Darrow Mustafa PC (57) ABSTRACT

A computer-implemented method of adaptively controlling an autonomous operation of a vehicle is provided. The method includes steps of (a) in a critic network in a computing system configured to autonomously control the vehicle, determining, using samples of passively collected data and a state cost, an estimated average cost, and an approximated cost-to-go function that produces a minimum value for a cost-to-go of the vehicle when applied by an actor network; and (b) in an actor network in the computing system and operatively coupled to the critic network, determining a control input to apply to the vehicle that produces the minimum value for the cost-to-go, wherein the actor network is configured to determine the control input by estimating a noise level using the average cost, a cost-to-go determined from the approximated cost-to-go function, a control dynamics for a current state of the vehicle, and the passively collected data.

19 Claims, 4 Drawing Sheets

(51) Int. Cl.
  G05B 13/04 (2006.01)
  G05B 13/02 (2006.01)
  B60W 50/00 (2006.01)

(52) U.S. Cl.
  CPC ... G05D 1/0088 (2013.01); *B60W 2050/0013* (2013.01); *B60W 2050/0014* (2013.01); *B60W 2600/00* (2013.01); *G05D 2201/0212* (2013.01)

(58) Field of Classification Search
  CPC ............ G01C 21/3664; G01C 21/3611; G01C 21/3673; G01C 21/3461; G01C 21/32; G01C 21/34; G01C 21/3632; G08G 1/096866; G08G 1/09685; G08G 5/0034; G08G 1/096844; B60W 2050/146; B60W 2540/26; B60W 2710/18; B60W 50/0097; B60W 50/14; G05D 1/0255; G05D 2201/0213; G05D 1/0011; G05D 1/0088; G05D 1/021; G05D 1/00
  USPC ..... 701/301, 45, 1, 36, 23, 117, 46, 49, 116, 701/27, 28
  See application file for complete search history.

(56) References Cited

U.S. PATENT DOCUMENTS

| | | | | |
|---|---|---|---|---|
| 6,532,454 | B1* | 3/2003 | Werbos | G05B 13/027 706/14 |
| 6,581,048 | B1* | 6/2003 | Werbos | G05B 13/0265 250/369 |
| 6,882,992 | B1* | 4/2005 | Werbos | G05B 13/027 706/16 |
| 9,134,707 | B2* | 9/2015 | Vamvoudakis | G05B 13/02 |
| 9,511,767 | B1* | 12/2016 | Okumura | G08G 1/0133 |
| 9,568,915 | B1* | 2/2017 | Berntorp | B60W 30/00 |
| 9,916,703 | B2* | 3/2018 | Levinson | G07C 5/0808 |
| 2010/0191391 | A1* | 7/2010 | Zeng | G01S 13/723 701/1 |
| 2010/0238009 | A1 | 9/2010 | Cook et al. | |
| 2010/0292871 | A1 | 11/2010 | Schultz et al. | |
| 2012/0158301 | A1* | 6/2012 | Schilling | H03M 7/40 701/533 |
| 2013/0151460 | A1* | 6/2013 | Burchard | G06N 7/02 706/52 |
| 2013/0217331 | A1 | 8/2013 | Manente | |
| 2013/0262353 | A1* | 10/2013 | Vamvoudakis | G05B 13/02 706/12 |
| 2014/0074388 | A1 | 3/2014 | Bretzigheimer et al. | |
| 2014/0142948 | A1 | 5/2014 | Rathi et al. | |
| 2015/0370228 | A1* | 12/2015 | Kohn | G06Q 50/06 700/31 |
| 2016/0092764 | A1* | 3/2016 | Burchard | G06N 3/006 706/19 |
| 2016/0202670 | A1* | 7/2016 | Ansari | G05B 13/026 700/45 |
| 2017/0124781 | A1* | 5/2017 | Douillard | B60Q 1/26 |
| 2018/0011488 | A1* | 1/2018 | Nishi | G05D 1/0088 |

OTHER PUBLICATIONS

Fairbank et al., "Value-gradient Learning", The 2012 International Joint Conference on Neural Networks (IJCNN), Jun. 2012,8 pgs, IEEE.

Konda et al., "Actor-critic Algorithms", Neural Information Processing Systems, 1999, pp. 1008-1014, vol. 13.

Lewis et al., "Reinforcement Learning for Partially Observable Dynamic Processes: Adaptive Dynamic Programming Using Measured Output Data ", IEEE Transactions on Systems, Man, and Cybernetics—Part B: Cybernetics, Feb. 2011, pp. 14-25, vol. 41, No. 1.

Moldovan et al., "Safe Exploration in Markov Decision Processes", In Proceedings of the 29th International Conference on Machine Learning (ICML-12), 2012, pp. 1711-1718, Omnipress.

Olstam et al., "Comparison of Car-following Models", Swedish National Road and Transport Research Institute, Project VTI Meddelande, 960A, 2004, 45 pgs.

Si et al., "Handbook of Learning and Approximate Dynamic Programming", 2004, pp. 97-127, Wiley-IEEE Press.

Sutton, "Learning to Predict by the Methods of Temporal Differences", Machine Learning, 1988, pp. 9-44, vol. 3, Kluwer Academic Publishers, Boston.

Sutton et al., "Reinforcement Learning: An Introduction", 1998, 291 pgs., MIT Press, Cambridge MA.

Todorov, "Linearly-solvable Markov Decision Problems", In Advances in Neural Information Processing Systems, 2006, pp. 1369-1376, vol. 19.

Todorov, "Efficient Computation of Optimal Actions", Proceedings of the National Academy of Sciences, 2009, pp. 11478-11483, vol. 106, No. 28.

Todorov, "Eigenfunction Approximation Methods for Linearly-solvable Optimal Control Problems", Conference: In Adaptive Dynamic Programming and Reinforcement Learning, IEEE Symposium, 2009, pp. 161-168.

Todorov, "Policy Gradients in Linearly-solvable mdps", In Advances in Neural Information Processing Systems, 2010, pp. 2298-2306.

Uichibe et al., "Combining Learned Controllers to Achieve New Goals Based on Linearly Solvable mdps", International Conference: Robotics and Automation (ICRA), IEEE International Conference, 2014, pp. 5252-5259.

Watkins, et al., "Technical Note, Q-Learning", Machine Learning, 1992, pp. 279-292, vol. 8, 1992 Kluwer Academic Publishers, Boston.

Wiering et al., Reinforcement Learning, 2012, pp. 31, vol. 12, Springer. ISBN: 978-3-642-27644-6 (Print) 978-3-642-27645-3 (Online).

Wei et al., "Autonomous Vehicle Social Behavior for Highway Entrance Ramp Management", IEEE Intelligent Vehicles Symposium (IV), Jun. 23-26, 2013, Gold Coast, Australia, 7 pages.

Wei et al., "A Prediction- and Cost Function-Based Algorithm for Robust Autonomous Freeway Driving", IEEE Intelligent Vehicles Symposium, University of California, Jun. 21-24, 2010, 6 pages.

Cunningham et al., "MPDM: Multipolicy Decision-Making in Dynamic, Uncertain Environments for Autonomous Driving", IEEE International Conference on Robotics and Automation (ICRA), Washington State Convention Center, Seattle, WA, May 26-30, 2015, 8 pages.

\* cited by examiner

FIG. 6 Freeway-Merge

ONLINE LEARNING AND VEHICLE CONTROL METHOD BASED ON REINFORCEMENT LEARNING WITHOUT ACTIVE EXPLORATION

TECHNICAL FIELD

The present invention relates to methods for autonomously controlling a vehicle and, more particularly, to a reinforcement learning method for revising and/or optimizing a control policy usable for autonomously controlling an operation of a vehicle.

BACKGROUND

Model-free reinforcement learning (RL) techniques may be employed in certain types of systems to determine an optimal system control policy by actively exploring an environment. However, it may be challenging to apply conventional RL approaches to control policies usable for autonomous control of vehicles due to potentially negative consequences associated with extensive active exploration of all the actions available to the vehicle. In addition, conducting active exploration in a manner needed to help ensure vehicle safety may exact a high computational cost. As an alternative, model-based RL techniques may be employed to determine an optimum control policy without active exploration by utilizing an accurate dynamics model of the environment in which the vehicle operates. However, the complex environment in which an autonomous vehicle operates may be very difficult to model accurately.

SUMMARY

In one aspect of the embodiments described herein, a computer-implemented method of adaptively controlling an autonomous operation of a vehicle is provided. The method includes steps of: (a) in a critic network in a computing system configured to autonomously control the vehicle, determining, using samples of passively collected data and a state cost, an estimated average cost, and an approximated cost-to-go function that produces a minimum value for a cost-to-go of the vehicle when applied by an actor network; and (b) in an actor network in the computing system and operatively coupled to the critic network, determining, a control input to apply to the vehicle that produces the minimum value for the cost-to-go, wherein the actor network is configured to determine the control input by estimating a noise level using the average cost, a cost-to-go determined from the approximated cost-to-go function, a control dynamics for a current state of the vehicle, and the passively collected data.

In another aspect of the embodiments of the described herein, a computing system configured for adaptively controlling an autonomous operation of a vehicle is provided. The computing system includes one or more processors for controlling operation of the computing system, and a memory for storing data and program instructions usable by the one or more processors, wherein the one or more processors are configured to execute instructions stored in the memory to: (a) determine, using samples of passively collected data and a state cost, an estimated average cost and an approximated cost-to-go function that produces a minimum value for a cost-to-go of the vehicle; and (b) determine a control input to apply to the vehicle that produces the minimum value for the cost-to-go, wherein the one or more processors are configured to determine the control input by estimating a noise level using the average cost, a cost-to-go determined from the cost-to-go function, a control dynamics for a current state of the vehicle, and the samples of passively collected data.

In another aspect of the embodiments of the described herein, a non-transitory computer readable medium is provided. The medium has stored therein instructions executable by a computer system to cause the computer system to perform functions, the functions comprising: determining, using samples of passively collected data and a state cost, an estimated average cost, and an approximated cost-to-go function that produces a minimum value for a cost-to-go of the vehicle; and determining a control input to apply to a vehicle to control an autonomous operation of the vehicle, wherein the control input produces the minimum value for the cost-to-go, and wherein the control input is determined by estimating a noise level using the average cost, a cost-to-go determined from the cost-to-go function, a control dynamics for a current state of the vehicle, and the samples of passively collected data.

DETAILED DESCRIPTION

Embodiments described herein relate to a computer-implemented reinforcement learning (RL) method usable for determining control inputs usable for autonomously controlling a vehicle, and for using the control inputs to revising and/or optimizing a control policy by which an operation of the vehicle may be autonomously controlled. The method may determine the control inputs and optimize a control policy without using active exploration (which may involve, for example, performing actions and monitoring results of the actions to determine and modify the control policy). Instead of active exploration, the method described herein uses data collected passively, a partially known system dynamics model, and a known control dynamics model of the vehicle being controlled.

In the context of this disclosure, "online" means that the computing system may learn, and actor and critic network parameters may be computed and updated, as the system operates (e.g. as the vehicle moves). Determining and updating actor and critic parameters using online solutions may allow for changing vehicle and system dynamics. Also, an autonomous operation is an operation that is performed autonomously.

Figure 1:
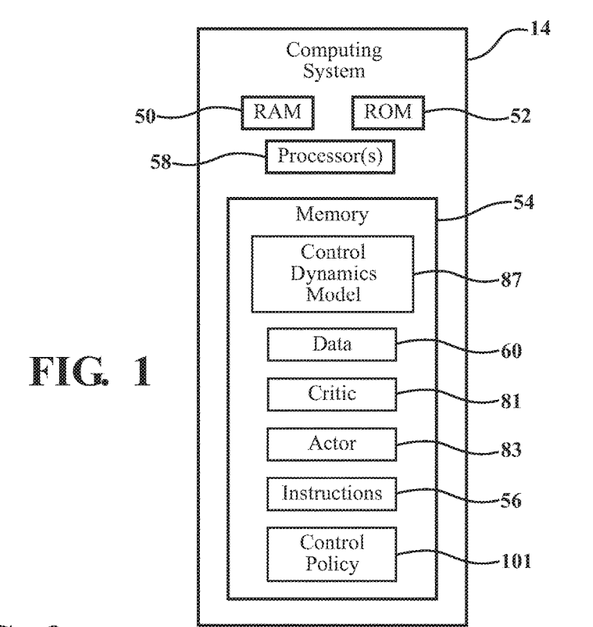
FIG. 1 is a block diagram of a computing system configured for determining control inputs to a system (for example, an autonomous vehicle), and for revising and/or optimizing a system control policy, in accordance with an embodiment described herein.

FIG. 1 is a block diagram of a computing system 14 configured for implementing methods in accordance with various embodiments disclosed herein. More specifically, in at least one embodiment, computing system 14 may be configured to determine control inputs in accordance with a method described herein. The computing system may also be configured for revising and/or optimizing a control policy usable for controlling a system (for example, an autonomous vehicle) to autonomously perform a specific operation or task.

In at least one embodiment, the computing system may be incorporated into a vehicle and may be configured to use generated control inputs to revise and/or optimize the control policy directed to controlling operation of the vehicle. At least some of the information (for example, data, instructions, and/or other information) required by the computing system to determine the control inputs and revise and/or optimize the control policy may be received from and/or gathered by any suitable means, for example, from vehicle sensors or from extra-vehicular sources such as remote databases via a wireless connection. In some embodiments, at least some of the information (for example, data) required by the computing system to revise and/or optimize the control policy may be provided to the computing system (for example, as data or other information stored in a memory) prior to operation of the vehicle. The computing system may also be configured to control the vehicle in accordance with the control inputs and/or in accordance with the revised or optimized control policy, to perform the associated autonomous operation.

In at least one embodiment, the computing system may be located remotely from the vehicle (for example, as a stand-alone computing system), and may be configured to determine control inputs and to revise and/or optimize a control policy directed to performing an autonomous operation of a vehicle. The optimized or revised control policy generated by the remote computing system may be loaded or installed into a vehicle computing system for deployment with the vehicle, to control the vehicle in an actual traffic environment.

Referring to FIG. 1, the computing system 14 may include one or more processors 58 (which could include at least one microprocessor) for controlling overall operation of the computing system 14 and associated components, and which executes instructions stored in a non-transitory computer readable medium, such as the memory 54. In the context of this disclosure, a computer-readable storage medium may be any tangible medium that can contain, or store a program for use by or in connection with an instruction execution system, apparatus, or device. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other.

In some embodiments, the computing system 14 may include RAM 50, ROM 52, and/or any other suitable form of computer-readable memory. The memory 54 may comprise one or more computer-readable memories. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

In one or more arrangements, the computing system 14 described herein can incorporate artificial or computational intelligence elements, e.g., neural network, fuzzy logic or other machine learning algorithms. Further, in one or more arrangements, the hardware and/or software elements configured for performing particular functions or operations described herein may be distributed among a plurality of elements and/or locations. In addition to computing system 14, the vehicle may incorporate additional computing systems and/or devices (not shown) to augment or support the control functions performed by computing system 14, or for other purposes.

The memory 54 may contain data 60 and/or instructions 56 (e.g., program logic) executable by the processor(s) 58 to execute various functions. Data 60 may include passively collected data. Passively collected data may be defined as data which is not collected from active exploration. One example of passively collected data is the dataset described in http://www.fhwa.dot.gov/publications/research/operations/06137/, which describes the acquisition of vehicle trajectories around the entrance of a freeway using cameras mounted on the top of a building. In another example, passively collected data may include data collected by vehicle sensors responsive to a maneuver executed by a human driver. Data may be collected and provided to a computing system relating to maneuvers executed by a human driver, the vehicle environmental conditions under which the maneuver was executed, and events occurring in the vehicle surroundings subsequent to the maneuver and/or in response to the maneuver. Alternatively, when the computing system is installed in a vehicle, the computing system 14 may be configured to gather and/or receive such passively collected data for online revision and/or optimization of one or more vehicle control policies (such as control policy 101).

A vehicle control dynamics model 87 may be a stimulus-response model describing how a vehicle responds to various inputs. The vehicle control dynamics model 87 may be used to determine (using passively-collected data) a state cost $q(x)$ and a control dynamics $B(x)$ for the vehicle in given vehicle state x, for use in determining control inputs to the vehicle and for revising and/or optimizing a control policy 101 as described herein. The vehicle control dynamics model 87 for any given vehicle may be determined and stored in a memory.

Referring again to FIG. 1, embodiments of the computing system may also include two learning systems or learning networks, and actor network (or "actor") 83 and a critic network (or "critic") 81, that interact with each other. These networks may be implemented using artificial neural networks (ANN's), for example.

For purposes described herein, a control policy 101 (also denoted by the variable $\pi$) may be defined as a function or other relationship that specifies or determines an action u to be taken by a vehicle in response to each state x of a set of states that the vehicle may be in. Thus, for each state x of the vehicle during execution of an autonomous operation, the vehicle may be controlled to perform an associated action $u=\pi(x)$. Therefore, the control policy controls operation of the vehicle to autonomously perform an associated operation, for example, freeway merging. The actor 83 may operate on the control policy to revise and/or optimize the policy using information received from the critic and other information. A vehicle operation as autonomously controlled by a control policy may be defined as a driving maneuver or set of driving maneuvers performed to accomplish a specific purpose, such as merging onto a freeway or changing lanes.

The computing system 14 is configured to execute a novel semi-model-free RL method (referred to herein as the passive actor-critic (pAC) method) usable for control policy revision and optimization. In this method, a critic learns an evaluation function for various states of the vehicle and an actor improves a control policy without active exploration, instead using data collected passively and a known vehicle control dynamics model. The method uses a partially-known system dynamics model, thereby obviating the need for active exploration. The method does not require knowledge of the uncontrolled dynamics of the vehicle environment or the transitional noise levels. This is feasible, for example, in the context of autonomous vehicles, where samples of how the environment noisily evolves are available but may be difficult to actively explore with the vehicle sensors.

For purposes of determining control inputs and revising and/or optimizing a control policy, a discrete-time stochastic dynamical system may be defined with a state $x \in R^n$ and a control input $u \in R^m$ as follows:

$$\Delta x = A(x_t)\Delta t + B(x_t)u_t\Delta t + C(x_t)d\omega \quad (1)$$

where $\omega(t)$ is Brownian motion. $A(x_t)$, $B(x_t)u_t$ and $C(x_t)$ denote the passive dynamics, vehicle control dynamics, and the transition noise level, respectively. $\Delta t$ is a step size of time. This type of system arises in many situations (e.g., models of most mechanical systems conform to these dynamics). The functions $A(x)$, $B(x)$, and $C(x)$ depend on the specific system being modeled, as should be appreciated. The passive dynamics include changes in the environment of a vehicle which are not the result of control inputs to the vehicle systems.

In the method and system described herein, an MDP for a discrete-time dynamical system is a tuple $\langle X, U, P, R \rangle$, where $X \subseteq R^n$ and $U \subseteq R^m$ are state and action spaces. $P := \{p(y|x, u)|x, y \in X, u \in U\}$ is a state transition model due to action and $R := \{r(x, u)|x \in X, u \in U\}$ is an immediate cost function with respect to state $x$ and action $u$. as previously described, a control policy $u = \pi(x)$ is a function that maps from a state $x$ to an action $u$. The cost-to-go function (or value function) $V^\pi(x)$ under the policy $\pi$, which is the expected cumulative cost, is defined as follows under the infinite horizon average-cost optimality criterion:

$$V^\pi(x_t) := \sum_{k=1}^{\infty} p(x_k, \pi(x_k))r(x_k, \pi(x_k))\Delta t - V^\pi_{avg}$$

$$V^\pi_{avg} := \lim_{N \to \infty} \frac{1}{N\Delta t}\sum_{k=1}^{N} p(x_k, \pi(x_k))r(x_k, \pi(x_k))\Delta t$$

where $V_{avg}^\pi$ is the average cost, k is the time index, and $\Delta t$ is the time step. An optimal cost-to-go function satisfies the following discrete time Hamilton-Jacobi-Bellman equation:

$$V^\pi_{avg} + V^\pi(x_k) = \min_{u_k} Q^\pi(x_k, u_k), \text{ where} \quad (2)$$

$$Q^\pi(x_k, u_k) := r(x_k, u_k)\Delta t + \mathcal{G}[V^\pi](x_k), \text{ and}$$

-continued $$\mathcal{G}[V^\pi](x_k) := \int_X p(y|x_k, \pi)V^\pi(y)dy$$

where $Q^\pi(x, u)$ is an action-value function and $\mathcal{G}[.]$ is an integral operator. The goal of the MDP is to find the control policy that minimizes the average cost over the infinite horizon, according to the following relationship:

$$\pi^*(x_k) = \arg\min_\pi \mathbb{E}[V^\pi_{avg}]$$

Hereafter, values under the optimal control policy may be represented with the superscript * (e.g., $V^*$, $V^*_{avg}$).

Linear MDP's (L-MDP's) for discrete-time dynamical systems are a subclass of the general Markov decision processes with the benefit that exact solutions may be quickly obtained for continuous state and action spaces. Under structured dynamics and separated state and control costs, a Bellman equation may be restructured as a linearized differential equation, for which the solution reduces to finding the linear Eigenfunction of the combined state cost and uncontrolled dynamics. Subsequently, the cost-to-go function (or value function) for the L-MDP may be efficiently obtained with optimization methods such as quadratic programming (QP) when an accurate dynamics model is available.

A linear formulation of the Markov Decision Process may be used to define a control cost and to add a condition on the vehicle dynamics as shown below:

$$r(x_k, u_k) := q(x_k) + KL(p(x_{k+1}|x_k)\|p(x_{k+1}|x_k, u_k)) \quad (3)$$

$$p(x_{k+1}|x_k) = 0 \Rightarrow \forall u_k, p(x_{k+1}|x_k, u_k) = 0 \quad (4)$$

Here, $q(x) \geq 0$ is the state-cost function, and $KL(\bullet\|\bullet)$ is the Kullback-Leibler (KL) divergence. Equation (3) relates the cost of an action to the amount of stochastic effect it has on the system and adds it to the state cost. The second condition ensures that no action introduces new transitions that are not achievable under passive dynamics. The stochastic dynamical system represented by Eq. (1) satisfies the assumption naturally.

The Hamilton-Jacobi-Bellman equation (Eq. (2)) can be recast in L-MDP form to a linearized differential equation for an exponentially transformed cost-to-go function (hereafter referred to as a linearized Bellman equation).

$$Z_{avg}Z(x_k) = \exp(-q(x_k)\Delta t)\mathcal{G}[Z](x_{k+1}), \quad (5)$$

$$Z(x) := \exp(-V^*(x)),$$

$$Z_{avg} := \exp(-V^*_{avg}),$$

$$p(x_{k+1}|x_k, \pi^*_k) = \frac{p(x_{k+1}|x_k)z(x_{k+1})}{\mathcal{G}[Z](x_{k+1})},$$

where $Z(x)$ and $Z_{avg}$ are an exponentially transformed cost-to-go function called the Z-value and an average cost under an optimal policy, respectively. Because the state transition in (Eq. (1)) is Gaussian, the KL divergence between the controlled and passive dynamics is represented as:

$$KL(p(x_{k+1}|x_k)\|p(x_{k+1}|x_k, u_k)) = \frac{1}{2\rho(x_k)}u_k^\top u_k, \quad (6)$$

-continued $$\frac{1}{\rho(x_k)} := B(x_k)^\top (C(x_k)^\top C(x_k))^{-1} B(x_k),$$

Then, the optimal control policy for an L-MDP system may be represented as:

$$\pi^*(x_k) = -\rho(x_k) B(x_k)^\tau V_{x_k},  \quad (7)$$

where $V_{x_k}$ is a partial derivative of the cost-to-go function V with respect to x at $x_k$. The Z-value and the average cost may be derived from the linearized Bellman equation by solving an Eigenvalue or Eigenfunction problem when the system dynamics are fully available.

Embodiments of the computing system 14 described herein determine states x(t) of a system (for example, a vehicle) by measuring, receiving and/or accessing various types of input and output information. For example, data may be measured using sensors coupled to, or otherwise in communication with, the system. The computing system 14 determines a control input u to achieve stability and desired motion of the vehicle characterized by equation (1) and also to minimize an energy-based cost function as described in equation (2).

Embodiments of the computing system 14 described herein include two learning systems or learning networks, an actor network (or "actor") 83 and critic network (or "critic") 81, that interact with each other. These networks may be implemented using artificial neural networks (ANNs). The actor 83 uses a state-dependent control policy to determine a control input u(x) that is applied to the vehicle and which produces the minimum value for a cost-to-go. The actor may be configured to determine the control input by estimating a noise level using the average cost, an estimated cost-to-go determined from the approximated cost-to-go function, a control dynamics for a current state of the vehicle, and the passively collected data. The critic 81 determines, using samples of passively collected data and a state cost, an estimated average cost, and an approximated cost-to-go function that produces a minimum value for a cost-to-go of the vehicle when applied by an actor network. In some embodiments disclosed herein, the actor 83 is implemented as an inner loop feedback controller and the critic 81 is implemented as an outer loop feedback controller. Both are located in a feed forward path with respect to vehicle actuatable mechanisms or controls which are operable to effect the control commands.

Using samples of passively collected data and a state cost q(x) received from the vehicle control dynamics model 87, the critic 81 evaluates a current state $x_k$ of the vehicle, a next state $x_{k+1}$, and the state cost $q_k$ under an optimal policy and uses the linearized version of the Bellman equation previously described (equation (5)) to determine an approximated cost-to-go function $\hat{Z}(x)$ (Z-value), and to generate an estimated average cost $\hat{Z}_{avg}$ for use by the actor 83. For purposes of estimating the Z-value, a linear combination of weighted radial basis functions (RBF's) may be used:

$$Z(x) \approx \hat{Z}(x) := \sum_{j=0}^{N} \omega_j f_j(x) \quad (60)$$

where ω are the weights, $f_j$ are j-th RBFs, and N is the number of RBFs. The basis functions may be suitably chosen depending on the nonlinear dynamics of the vehicle system. The weights are optimized by minimizing the least square error between the exponentiated true cost-to-go and estimated cost-to-go. Let $Z(x_k)$ and $Z_{avg}$ be the true Z-value and the true average Z-value cost, and $\hat{Z}_k$, $\hat{Z}_{avg}$ their estimated counterparts, respectively. The approximated cost-to-go function may be learned by the critic network in real time.

$$\min_{\omega, \hat{Z}_{avg}} \frac{1}{2} \sum_D (\hat{Z}_{avg} \hat{Z}_k - Z_{avg} Z_k)^2, \quad (8)$$

$$\text{s.t} \sum_{i=0}^{N} \omega_i = C, \forall i \, \omega_i \geq 0, \forall x \hat{Z}_{avg} \hat{Z}(x) \leq 1, \quad (9)$$

where C is a constant value used to avoid convergence to a trivial solution ω=0. The second and third constraints are needed to satisfy $\forall x$, $0 < Z_{avg} Z(x) \leq 1$, \which comes from Eq. (5) and $\forall x$, q(x)≥0.

The weights ω and the average cost $\hat{Z}_{avg}$ may be updated based on Lagrangian-relaxed Temporal Difference (TD) learning by approximating the error between true and estimated cost-to-go with an approximated temporal difference error $e_k$ determined as follows from the linearized Bellman equation (LBE) (equation (5)) because the true cost-to-go and the true average cost may not be determined with the information used for the pAC method:

$$\hat{Z}_{avg} \hat{Z}_k - Z_{avg} Z_k \approx e_k := \hat{Z}_{avg} \hat{Z}_k - \exp(-q_k) \hat{Z}_{k+1} \quad (10)$$

$$\tilde{\omega}^{i+1} = \omega^i - \alpha_1^i e_k Z_{avg} f_k$$

$$\omega^{i+1} = \tilde{\omega}^i + \lambda_1 + \sum_{l=0}^{N} \lambda_{2l} \delta_{jl} + \lambda_3 \hat{Z}_{avg} f_k \quad (11)$$

$$\hat{Z}_{avg}^{i+1} = \hat{Z}_{avg}^j - \alpha_2^i e_k \hat{Z}_k \quad (11A)$$

where $\alpha_1^i$ and $\alpha_2$ are learning rates and $e_k$ is TD error for L-MDPs. $\delta_{ij}$ denotes the Dirac delta function. The superscript i denotes the number of iterations. $\lambda_1, \lambda_2, \lambda_3$ are Lagrangian multipliers for constraint Eq. (9). ω is updated to minimize the error with Eq. (10) and to satisfy the constraints with Eq. (11). An iteration may be defined as an update of the critic and actor parameters (such as weights ω for the critic and μ for the actor). In addition, updating of the critic network parameters may be performed when the vehicle is in motion. In the methods described herein, wherein the only data that is used during update of the critic network parameters is passively-collected data.

Values of the multipliers are calculated by solving the following equation.

$$\begin{bmatrix} \sum_j f_j & f_0 \ldots f_N & f^\top f \\ 1 & 1 \ldots 0 & f_0 \\ \vdots & \ddots & \vdots \\ 1 & 0 \ldots 1 & f_N \\ N & 1 \ldots 1 & \sum_j f_j \end{bmatrix} \begin{bmatrix} \lambda_1^i \\ \lambda_2^i \\ \lambda_3^i \end{bmatrix} = \begin{bmatrix} c - \sum_j \tilde{\omega}^j \\ -\tilde{\omega}_0^i \\ \vdots \\ -\tilde{\omega}_N^i \\ 1 - \hat{Z}_{avg} \hat{Z}_k \end{bmatrix}$$

In some cases, a subset of constraints may not be valid. In such cases, the multipliers for those constraints are set to zero and the multipliers for the remaining valid constraints are obtained. The critic updates the parameters using a state transition sample under passive dynamics ($x_k x_{k+1}$) and state cost $q_k$, which is independent of control policy. The weights ω, the estimated Z-value $\hat{Z}$, and the average cost $\hat{Z}_{avg}$ may be updated online according to the equations (10)-(11A), while the vehicle is in motion.

An actor 83 in the computing system and operatively coupled to the critic network may determine a control input to apply to the vehicle that produces the minimum value for the cost-to-go. Using the estimated cost-to-go $\hat{Z}$ and estimated average cost $\hat{Z}_{avg}$ generated by the critic, a state cost q(x), control dynamics information B(x) for the current state as determined from the vehicle control dynamics model 87, and the samples of passively collected data used by the critic to estimate the cost-to-go function $\hat{Z}(x)$, and to generate the estimated average cost $\hat{Z}_{avg}$, the actor 83 may determine the control input. The control input may be used to revise the control policy π. In particular embodiments, the policy π is iteratively revised in the manner described above until convergence, at which time it is deemed to be optimized. The actor improves the control policy using the standard Bellman equation and without active exploration. The control dynamics may be determined from a known control dynamics model for the vehicle.

The actor 83 may also apply the control inputs u(x) to the vehicle systems in real time to autonomously perform a desired operation (for example, freeway merging, lane changing, etc.). In some embodiments disclosed herein, the actor 83 may be embodied in an inner loop feedback controller and the critic 81 may be embodied in an outer loop feedback controller. Both controllers may be located in a feed forward path with respect to the vehicle actuatable controls.

The actor 83 improves or revises a control policy by estimating a noise level ρ using the estimated values from the critic (e.g., $\hat{Z}$ and $\hat{Z}_{avg}$), a sample under passive dynamics, and a known control dynamics. The noise level is approximated learned with a linear combination of weighted radial basis functions.

$$\rho(x; \mu) \approx \hat{\rho}(x; \mu) := \sum_{j}^{M} \mu_j g_j(x) \quad (12)$$

where $\mu_j$ is the weight for the j-th radial basis function $g_j$. M is the number of radial basis functions.

ρ is optimized by minimizing least square error between a cost-to-go and an action-state value.

$$\min_{\mu} \frac{1}{2} \sum_{D} (\hat{Q}_k - V_k^* - V_{avg}^*)^2$$

where $V^*$, $V^*_{avg}$, and $\hat{Q}$ are the true cost-to-go function, average cost, and estimated action-state value under the optimal control policy. The optimal control policy can be learned by minimizing the objective function because the true action-value cost equals $V^*+V^*_{avg}$ if and only if a policy is the optimal policy. $\hat{Z}_k$ and $\hat{Z}_{avg}$ may be used to determine $\hat{V}_k$ and $\hat{V}_{avg}$ when updating the noise level, according to the following relationships:

$$\hat{V}_k = -\log(\hat{Z}_k)$$

$$\hat{V}_{avg} = -\log(\hat{Z}_{avg})$$

The weighty μ is updated with the approximate temporal difference error $d_k$ defined below. The standard Bellman equation is approximated to determine the error $d_k$ because the true cost-to-go and the true average cost cannot be calculated.

$$\hat{Q}_k - V_k^* - V_{avg}^* \approx d_k := \hat{Q}_k - \hat{V}_k - \hat{V}_{avg}$$

$$\hat{Q}_k \approx q_k \Delta t + \frac{0.5 \Delta t}{\hat{\rho}_k} u_k^\top u_k + \hat{V}(x_{k+1} + B_k u_k \Delta t)$$

$$u_k \approx -\hat{\rho}_k B_k^\top \hat{V}_k,$$

where $x_{k+1}$ is a next state under passive dynamics and $x_{k+1}+B_k u_k \Delta t$ is a next state under controlled dynamics with action $u_k$. The estimated cost-to-go, the average cost and derivative values of them can be calculated by utilizing the estimated Z-value and the average Z-value cost from the critic. Moreover $\hat{V}(x_{k+1}+B_k u_k \Delta t)$ may be approximated to linearize the TD error with respect to μ by $$\hat{V}(x_{k+1} B_k u_k \Delta t) \approx \hat{V}_{x_{k+1}} \hat{V}_{x_{k+1}}^\top B_k U_k \Delta t.$$

μ may be updated using temporal difference (TD) learning with the approximated TD error $d_k$.

$$\mu^{i+1} = \mu^i - \beta d_k L_{k,k+1} g_k,$$

$$d_k \approx q_k \Delta t - \hat{V}_{k+1} + \hat{V}_k + \hat{V}_{avg} + L_{k,k+1} \rho_k,$$

$$L_{k,k+1} := (0.5 \hat{V}_k - \hat{V}_{k+1})^\top B_k B_k^\top \hat{V}_k \Delta t$$

where $\beta^i$ is a learning rate and $L_{k,k+1}$ is a shorthand version of the term L ($x_k$, $x_{k+1}$).

This procedure improves the policy without active exploration by using a state transition sample ($x_k, x_{k+1}$) under passive dynamics, a state cost $q_k$, and the control dynamics $B_k$ in the give state. Standard actor-critic methods optimize a policy with active exploration. With these actor and critic functions defined, the computing system 14 is able to implement semi-model-free reinforcement learning using L-MDP's.

In the methods described herein, the policy is optimized with a parameter which is learned using samples of passively-collected data and knowledge of the vehicle control dynamics, by minimizing the error between a cost-to-go and an action-state value. The methods described herein enable an optimal policy to be determined with the vehicle's own dynamics model, which is usually available to control the car. The methods also use passively-collected data relating to maneuvers of surrounding vehicles whose dynamics models are usually not known. In addition, using the methods described herein, the passive dynamics $A(x_t)$ of the vehicle environment and the transition noise level and $C(x_t)$ do not need to be known to determine the optimum control policy.

Figure 2:
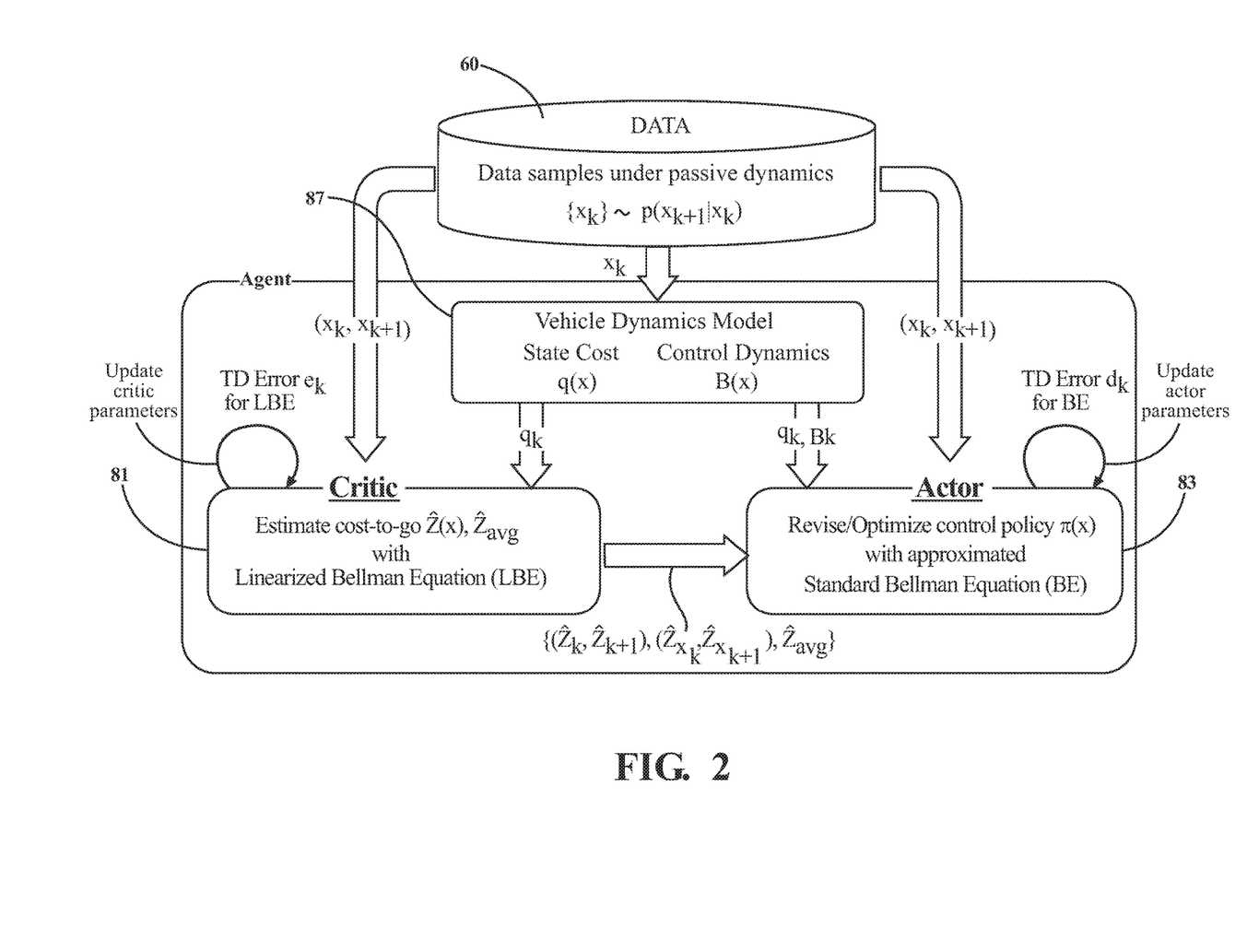
FIG. 2 is a schematic diagram illustrating an information flow during determination of a vehicle control input and/or revision or optimization of a control policy, in accordance with a method described herein.

FIG. 2 is a schematic diagram showing information flow during determination of control inputs and execution of control policy revisions and control policy optimization in computing system 14, in accordance with a method described herein. While a conventional actor-critic method may operate using samples of data collected actively from the environment, the pAC method described herein determines an optimal control policy without active exploration of the environment, instead using samples collected passively and a known vehicle control dynamics model. Any information received in either the critic 81 or the actor 83 may be buffered in a memory for later use. For example, in a situation where all of the information needed for the critic or actor to calculate or estimate a parameter value is not currently available, the received information may be buffered until the remaining required information is received.

Figure 3:
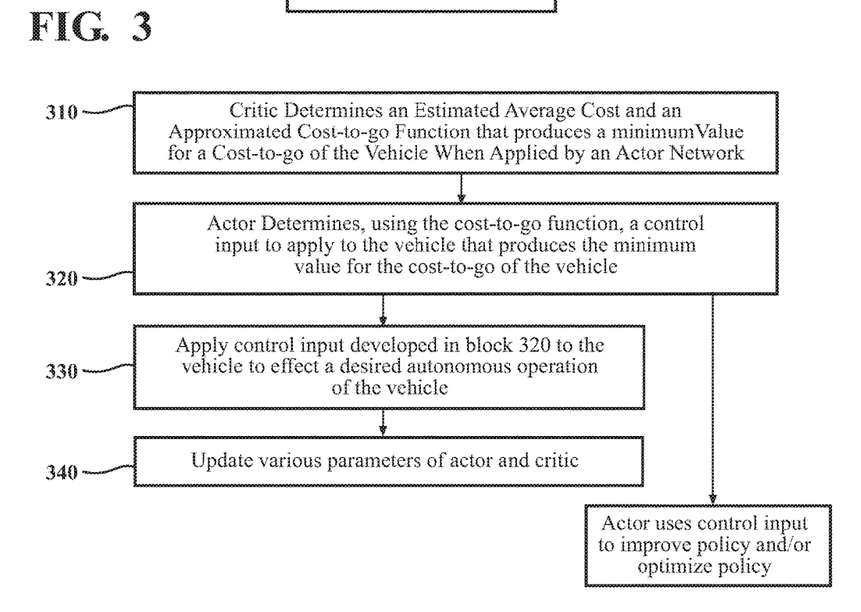
FIG. 3 is a flow diagram illustrating operation an embodiment of a method for determining a control input and revising and/or optimizing a control policy.

FIG. 3 is a flow diagram illustrating operation of the computing system of FIG. 1 for purposes of determining control inputs and revising and/or optimizing a control policy according to some embodiments disclosed herein.

The process may begin in block 310, where the critic 81 may determine an estimated average cost $\hat{Z}_{avg}$ and an approximated cost-to-go function $\hat{Z}(x)$ that produces a minimum value for a cost-to-go of the vehicle when applied by an actor network.

Next, in block 320, the actor 83 may determine, using the cost-to-go function $\hat{Z}(x)$, a control input to apply to the vehicle that produces the minimum value for the cost-to-go of the vehicle. The actor 83 may revise the control policy $\pi$ to improve the policy and/or to optimize the control policy.

In block 330, the control input developed in block 320 may be applied to the vehicle to effect a desired autonomous operation of the vehicle, for example, merging onto a freeway or changing lanes. The vehicle may also be further controlled in accordance with any improved or optimized control policy $\pi$. In particular embodiments, the vehicle operation may be controlled by the computing system using a latest version of the control policy, even if the policy has not yet been improved to the point where it is considered to be optimized.

In block 340, various parameters of the actor 83 and the critic 81 may be updated. The updates may be performed in accordance with the relationships described herein. The only data used for the updates may be passively collected data. In certain embodiments, the actor and the critic may perform updates of their respective parameters. Alternatively, the actor and critic parameter updates may be performed by a policy iterator (not shown) or similar means.

Figure 4:
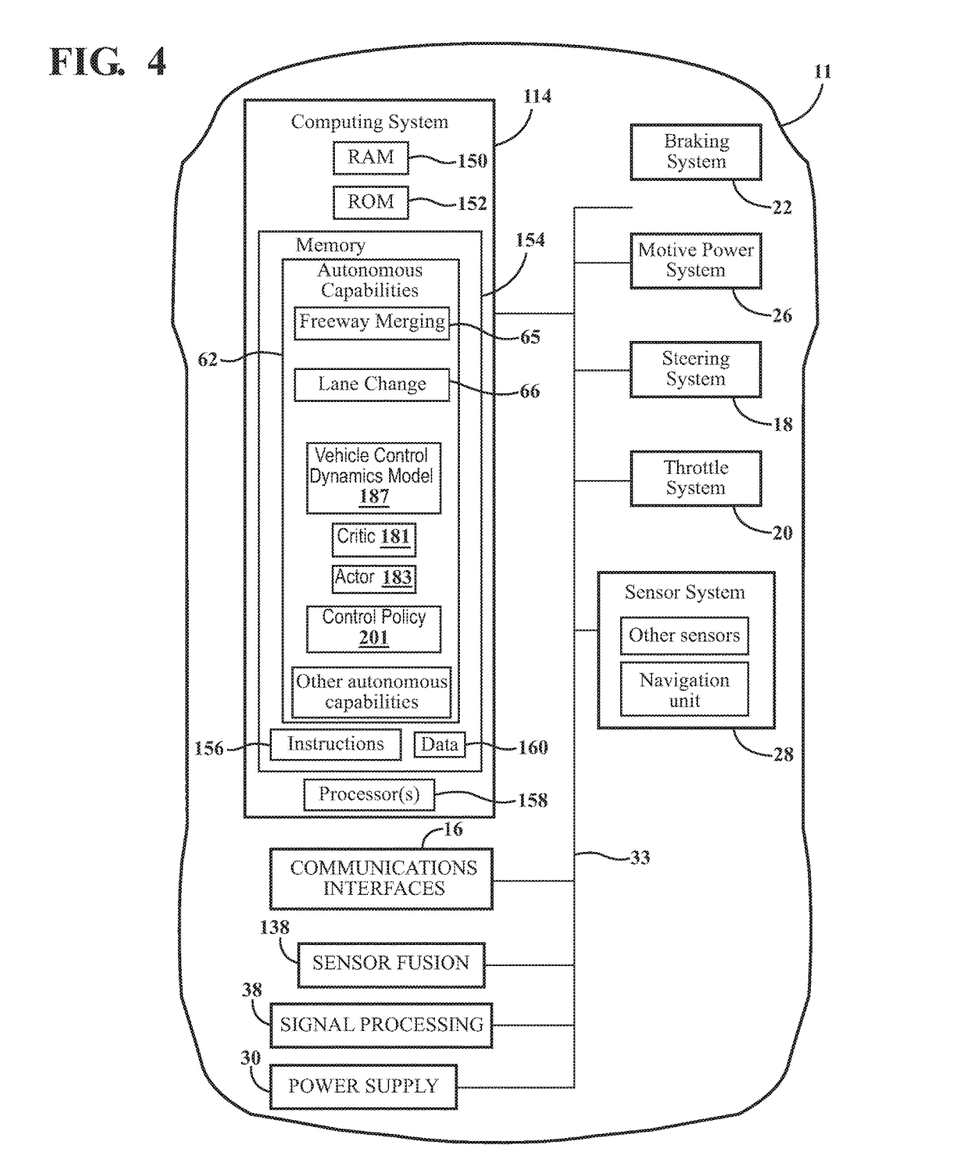
FIG. 4 is a schematic block diagram of a vehicle configured for autonomous control using one or more control inputs and a control policy, and incorporating a computing system configured for determining control inputs to the vehicle and for revising and/or optimizing an autonomous vehicle operation control policy, in accordance with an embodiment described herein.

FIG. 4 is a functional block diagram illustrating a vehicle 11 in accordance with an example embodiment, incorporating a computing system 114 configured in a manner similar to computing system 14 of FIG. 1. The vehicle 11 may take the form of a car, truck, or any other vehicle capable of performing the operations described herein. The vehicle 11 may be configured to operate fully or partially in an autonomous mode. While operating in an autonomous mode, the vehicle 11 may be configured to operate without human interaction. For example, in an autonomous mode in which a freeway merging operation is being executed, the vehicle may operate the throttle, braking and other systems so as to maintain a safe distance from vehicles on the freeway, to match speeds with the other vehicles, etc., without input from a vehicle occupant.

The vehicle 11 may include various systems, subsystems and components in addition to computing system 114 and in operative communication with each other, such as a sensor system or array 28, one or more communications interfaces 16, a steering system 18, a throttle system 20, a braking system 22, a power supply 30, a motive power system 26, and other systems and components needed for operating the vehicle as described herein. The vehicle 11 may include more or fewer subsystems than those shown in FIG. 4, and each subsystem could include multiple elements. Further, each of the subsystems and elements of vehicle 11 may be interconnected. Performance of one or more of the described functions and/or autonomous operations of the vehicle 11 may be executed by multiple vehicle systems and/or components operating in conjunction with each other.

The sensor system 28 can include any suitable type of sensor. Various examples of different types of sensors will be described herein. However, it will be understood that the embodiments are not limited to the particular sensors described.

The sensor system 28 may include a number of sensors configured to sense information about an external environment of the vehicle 11. For example, the sensor system 28 may include a navigation unit such as a Global Positioning System (GPS) and other sensors, for example, an inertial measurement unit (IMU) (not shown), a RADAR unit (not shown), a laser rangefinder/LIDAR unit (not shown), and one or more cameras (not shown) comprising devices configured to capture a plurality of images of the interior of the vehicle and/or an external environment of the vehicle 11. The camera(s) may be still cameras or video cameras. The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth. The navigation unit may also be configured to determine or plan a driving route from a given start point (for example, a current location of the vehicle) to a selected destination, using stored and/or available maps, in a manner known in the art.

In a known manner, the vehicle sensors 28 provide data used by the computing system 114 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities and autonomous operational capabilities incorporated into the vehicle 11. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

Any data collected by vehicle sensors 28 may also be transmitted to any vehicle system or component requiring or utilizing the data for the purposes described herein. For example, the data collected by vehicle sensors 28 may be transmitted to computing system 114, or to one or more specialized system or component controllers (not shown). Additional particular types of sensors may include any other types of sensors needed to perform the functions and operations described herein.

Information from particular vehicle sensors may be processed and used to control more than one vehicle system or component. For example, in a vehicle incorporating both automated steering and braking control, various road condition sensors may provide data to the computing system 114 to enable the computing system to process the road condition information in accordance with stored processor-executable instructions, and to formulate appropriate control commands to both the steering system and braking system.

The vehicle 11 may include a suitable signal processing means 38 for situations where a sensor output signal or other signal requires pre-processing prior to use by the computing system 114 or another vehicle system or element, or where a control signal sent from the computing system will require processing prior to use by actuatable sub-systems or sub-system components (for example, components of the steering system or throttle system). The signal processing means may be an analog-to-digital (A/D) converter or digital-to-analog (D/A) converter, for example.

A sensor fusion capability 138 may be in the form of an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or another algorithm. The sensor fusion algorithm 138 may further provide various assessments based on data from the sensor system 28. In an example embodiment, the assessments may include evaluations of individual objects or features in the environment of the vehicle 11, evaluation of a particular situation, and evaluation of possible impacts based on the particular situation. Other assessments are also possible. The sensor fusion algorithm 138 may be stored on a memory (such as memory 54) incorporated into or in operative communication with computing system 114, and may be executed by the computing system in a manner known in the art.

The use of "continuously" when referring to the reception, gathering, monitoring, processing, and/or determination of any information or parameters described herein means that the computing system 114 is configured to receive and/or process any information relating to these parameters as soon as the information exists or is detected, or as soon as possible in accordance with sensor acquisition and processor processing cycles. As soon as the computing system 114 receives data from sensors or information relating to the status of a vehicle component for example, the computing system may act in accordance with stored programming instructions. Similarly, the computing system 114 may receive and process an ongoing or continuous flow of information from sensor system 28 and from other information sources. This information is processed and/or evaluated in accordance with instructions stored in a memory, in a manner and for the purposes described herein.

FIG. 4 also illustrates a block diagram of an exemplary computing system 114 configured in a manner similar to computing system 14 of FIG. 1, as previously described. As well as incorporating the features needed for performing the policy revisions and determining control inputs as described herein, the computing system 114 may be operatively connected to the other vehicle systems and elements and otherwise configured so as to affect control and operation of the vehicle 11 and its components. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may control the functioning of the vehicle 11 based on inputs and/or information received from various subsystems (e.g., motive power system 26, sensor system 28, steering system 18, etc.), from any of the communications interfaces 16, and/or from any other suitable source of information.

In the embodiment of FIG. 4, the computing system 114 may include a vehicle control dynamics model 187, a critic 181, an actor 183, and a control policy 201 as previously described with respect to FIG. 1. The computing system 114 may be configured for determining control inputs and revising and/or optimizing an autonomous vehicle operation control policy as previously described. The computing system 114 may also be configured for controlling the vehicle to perform a desired operation in accordance with a control input and also in accordance with a revised or optimized control policy as described herein.

The computing system 114 may have some or all of the elements shown in FIG. 4. In addition, the computing system 114 may also include additional components as needed or desired for particular applications. The computing system 114 may also represent or be embodied in a plurality of controllers or computing devices that may process information and/or serve to control individual components or subsystems of the vehicle 11 in a distributed fashion.

The memory 54 may contain data 60 and/or instructions 56 (e.g., program logic) executable by the processor(s) 58 to execute various functions of the vehicle 11, including those described above in connection with FIG. 1. The memory 54 may contain additional instructions as well, including instructions to transmit data to, receive data from, interact with, or control one or more of the vehicle systems and/or components described herein (for example, motive power system 26, sensor system 28, computing system 114, and the communication interfaces 16). In addition to the instructions 56, the memory 54 may store data such as roadway maps, path information, among other information. Such information may be used by the vehicle 11 and the computer system 114 for route planning and otherwise during the operation of the vehicle 11 in autonomous, semi-autonomous, and/or manual modes.

The computing system 114 may be configured to coordinate control of the various actuatable vehicle systems and components so as to implement one or more autonomous capabilities or operations (generally designated 62. These autonomous capabilities 62 may be stored in memory 54 and/or in other memories and implemented in the form of computer-readable program code that, when executed by a processor, implement one or more of the various processes, instructions or functions described herein.

Communications interfaces 16 may be configured to allow interaction between the vehicle 11 and external sensors, other vehicles, other computer systems, various external messaging and communications systems (such as a satellite system, a cellular phone/wireless communication system, various vehicle service centers as described herein, etc.) and/or a user. The communications interfaces 16 may include a user interface (for example, one or more displays (not shown), voice/audio interfaces (not shown) and/or other interfaces) for providing information to or receiving input from a user of the vehicle 11.

The communications interfaces 16 may also include interfaces enabling communication in a wide area network (WAN), a wireless telecommunications network, and/or any other suitable communications networks. The communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and the vehicle 11 and any nearby roadside communications nodes and/or infrastructure.

When used in a WAN networking environment, the computing system 114 may include (or be operatively connected to) a modem or other means for establishing communications over the WAN, such as network (e.g., the Internet). When used in a wireless telecommunications network, the computing system 114 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information from various external sources.

The vehicle 11 may include various actuatable sub-systems and elements in operative communication with computing system 114 and other vehicle systems and/or components, and which are operable responsive to control commands received from the computing system. Various actuatable sub-systems and elements may be controlled manually or automatically (by computing system 114) depending on such factors as a given driving situation, which autonomous driving assistance systems (for example, ACC and/or lane keeping) are activated, and/or whether the vehicle is being driven in a fully autonomous mode.

The steering system 18 may include such elements as the vehicle wheels, rack-and-pinion steering gears, steering knuckles, and/or any other elements or combination of elements (including any computer system-controllable mechanisms or elements) that may be operable to adjust the heading of vehicle 11. The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The braking system 22 could include any combination of elements and/or any computer system-controllable mechanisms configured to decelerate the vehicle 11. The throttle system may include elements and/or mechanisms (for example, an accelerator pedal and/ or any computer system-controllable mechanisms configured to control, for instance, the operating speed of the engine and, in turn, control the speed of the vehicle 11. FIG. 1 shows just a few examples of vehicle sub-systems 18, 20, 22, 26 which may be incorporated into a vehicle. A particular vehicle may incorporate one or more of these systems or other systems (not shown) in addition to one or more of the systems shown.

The vehicle 11 may be configured so that the computing system 114, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections), or the connections may be wireless connections.

Although FIG. 1 shows various components of vehicle 11 such as computing system 14, memory 54, and communications interfaces 16, as being integrated into the vehicle 11, one or more of these components could be mounted or associated separately from the vehicle 11. For example, memory 54 could, in part or in full, exist separately from the vehicle 11. Thus, the vehicle 11 could be provided in the form of device elements that may be located separately or together. The device elements that make up vehicle 11 could be communicatively coupled together in a wired or wireless fashion.

EXAMPLE

Figure 5:
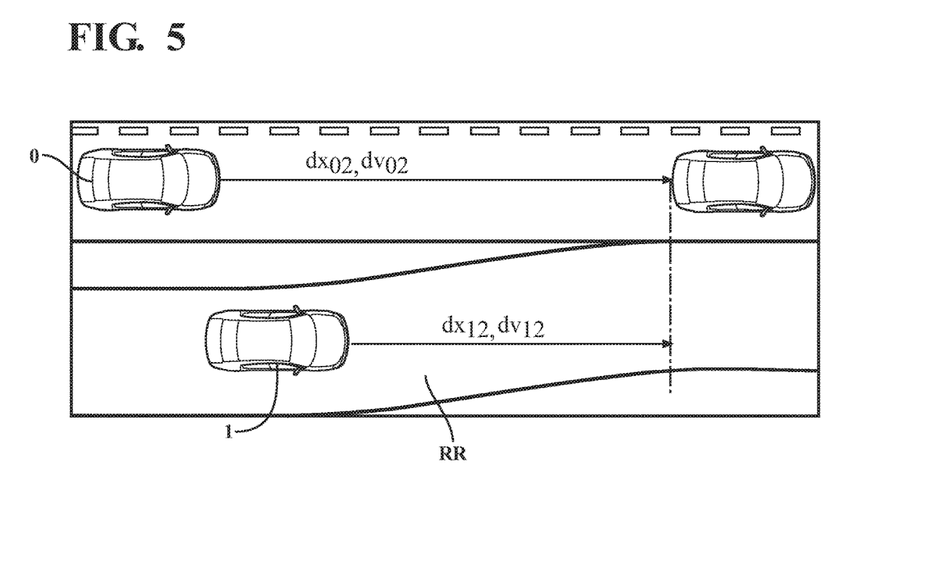
FIG. 5 is a schematic view of an arrangement of vehicles employed in an example of a freeway-merge control policy optimization, using a method in accordance with an embodiment described herein.
Figure 6:
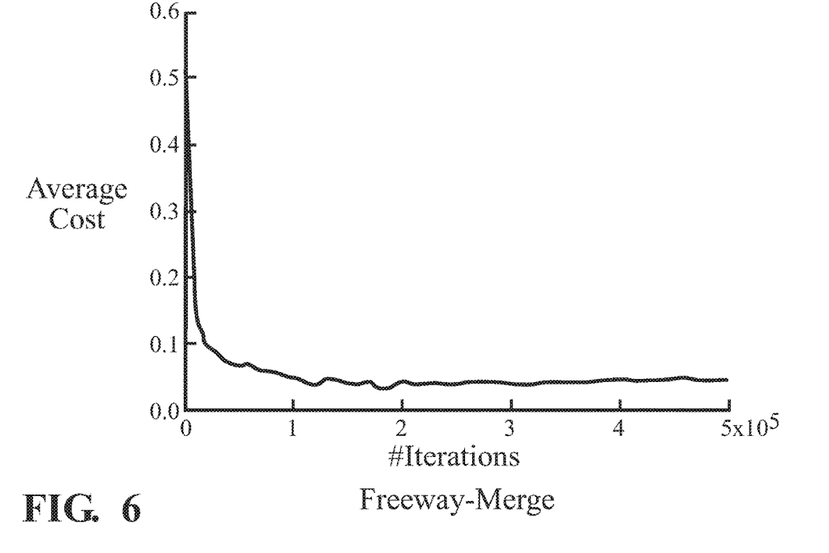
FIG. 6 is a graphical representation of the optimization performed in relation to the arrangement of vehicles shown in FIG. 5.

Referring to FIGS. 5 and 6, in one example of implementation of an embodiment of the control input and policy revision/optimization method described herein, an autonomous freeway merging operation is simulated. This operation has a four-dimensional state space and a one-dimensional action space. The dynamics are:

$$x = [dx_{12}, dv_{12}, dx_{02}, dv_{02}]^\top,$$
$$A(x) = [dx_{12}, 0, dv_{02}, +0.5\alpha_0(x)\Delta t, \alpha_0(x)]^\top$$
$$B(x) = [0.5\Delta t, 1, 0, 0]^\top, C(x) = [0, 2.5, 0, 2.5]^\top$$
$$\alpha_0(x) = \alpha \frac{v_2^\beta(-dv_{02})}{-dx_{02}^\gamma}, \Delta t = 0.1 [\text{sec}]$$

where the subscript 0 denotes the vehicle that is behind the merging vehicle on the freeway's rightmost lane (referred to as the "following vehicle"), 1 denotes the merging automated vehicle on the ramp RR, and 2 denotes the vehicle that is in front of the merging vehicle on the right most lane of the freeway (referred to as the "leading vehicle"). $dx_{12}$ and $dv_{12}$ denote the merging vehicle's relative position and velocity from the leading vehicle. For purposes of the example, it is assumed that the leading vehicle is driven with constant speed $v_2=30$ meters/sec and that a vehicle control dynamics model for the following vehicle is known. If the following vehicle's velocity is slower than that of the leading vehicle, ($dv_{02}<0$), $\alpha=1.55$, $\beta=1.08$, $\gamma=1.65$; otherwise $\alpha=2.15$, $\beta=-1.65$, $\gamma=-0.89$. The state cost $q(x)$ is:

$$q(x) = k_1 \left( 1.0 - \exp\left( -k_2 \left( 1 - \frac{2dx_{12}}{dx_{02}} \right)^2 - k_3(dv_{10})^2 \right) \right)$$

where $k_1$, $k_2$ and $k_3$ are weights for the state cost; if the merging vehicle is between the following and leading vehicles on the ramp (i.e., in a condition where $dx_{12}<0$ and $dx_{12}>dx_{02}$), $k_1=1$, $k_2=10$ and $k_3=10$; otherwise $k_1=10$, $k_2=10$ and $k_3=0$. The cost is designed to motivate the automated car to merge midway between the following and leading vehicles with the same velocity as the following vehicle. Initial states are randomly selected in $-100<dx_{12}<100$ meters, $-10<dv_{12}<10$ meters/sec, $-100<dx_{02}<-5$ meters, and $-10<dx_{02}<10$ meters/sec. Gaussian radial basis functions were used to approximate the Z-value:

$$fi(x) = \exp(-\tfrac{1}{2}(x-m_i)^\top Si(x-mi))$$

where mi and Si are the mean and inverse covariance for the i-th radial basis function. For the freeway merging simulation, the Z-value was approximated with 4,096 Gaussian radial basis functions whose means were set on vertices of a grid composed of 8 values per dimension of state. The standard deviations of the bases were 0.7 of the distance between the closest two bases in each dimension. g(x)=1 was used to estimate ρ(x) because the actual value of ρ(x) is constant in the example. The method optimized a policy from 10,000 samples collected by simulating the passive dynamics. FIG. 6 shows the rate of merging successfully in 30 seconds (expressed as the number of iterations required for convergence) starting from 125 different initial states, using successive control inputs determined by the methods described herein.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As will be appreciated by one skilled in the pertinent art upon reading the disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. In addition, various signals representing data, instructions or events as described herein may be transferred between a source and a destination in the form of electromagnetic waves traveling through signal-conducting media such as metal wires, optical fibers, and/or wireless transmission media (e.g., air and/or space).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Accordingly, reference should be made to the following claims, rather than to the foregoing specification, as indicating the scope of the invention.

What is claimed is:

1. A computer-implemented method of adaptively controlling an autonomous operation of a vehicle, the method comprising:
   a) in a critic network in a computing system configured to autonomously control the vehicle, determining, using samples of passively collected data and a state cost, an estimated average cost, and an approximated cost-to-go function that produces a minimum value for a cost-to-go of the vehicle when applied by an actor network; and
   b) in an actor network in the computing system and operatively coupled to the critic network, determining a control input to apply to the vehicle which produces the minimum value for the cost-to-go,
   wherein the actor network is configured to determine the control input by estimating a noise level using the estimated average cost, an estimated cost-to-go determined from the approximated cost-to-go function, a control dynamics for a current state of the vehicle, and the samples of passively collected data, and
   wherein the approximated cost-to-go function is determined using a linear combination of weighted radial basis functions in accordance with the following relationship:

$$\hat{Z}(x) := \sum_{j=0}^{N} \omega_j f_j(x)$$

where ω are weights, $f_j$ are j-th radial basis functions, N is a number of radial basis functions used for determining the approximated the cost-to-go function, and $\hat{Z}(x)$ is the approximated cost-to-go function.

2. The method of claim 1 wherein weights ω used in the approximated cost-to-go function are updated in accordance with the following relationship:

$$\omega^{i+1} = \tilde{\omega}^i + \lambda_1 + \sum_{i=0}^{N} \lambda_{2l}\delta_{jl} + \lambda_3 \hat{Z}_{avg} f_k$$

where $\delta_{ij}$ denotes a Dirac delta function, superscript i denotes a number of iterations, $\lambda_1, \lambda_2, \lambda_3$ are Lagrangian multipliers, and $\hat{Z}_{avg}$ is an estimated average cost.

3. The method of claim 1 further comprising the step of updating parameters of the critic network using an approximated temporal difference error determined using a linearized version of a Bellman equation.

4. The method of claim 3 wherein updating of the critic network parameters is performed when the vehicle is in motion.

5. A computer-implemented method of adaptively controlling an autonomous operation of a vehicle, the method comprising:
   a) in a critic network in a computing system configured to autonomously control the vehicle, determining, using samples of passively collected data and a state cost, an estimated average cost, and an approximated cost-to-go function that produces a minimum value for a cost-to-go of the vehicle when applied by an actor network; and
   b) in an actor network in the computing system and operatively coupled to the critic network, determining a control input to apply to the vehicle which produces the minimum value for the cost-to-go,
   wherein the actor network is configured to determine the control input by estimating a noise level using the estimated average cost, an estimated cost-to-go determined from the approximated cost-to-go function, a control dynamics for a current state of the vehicle, and the samples of passively collected data,
   the method further comprising the step of updating parameters of the critic network using an approximated temporal difference error determined using a linearized version of a bellman equation, and wherein the estimated average cost determined by the critic network is updated in accordance with the following relationship:

$$\hat{Z}_{avg}{}^{i+1} = \hat{Z}_{avg}{}^{i} - \alpha_2{}^{i} e_k \hat{Z}_k$$

where β is a learning rate, $e_k$ is the approximated temporal difference error, $\hat{Z}_k$ is an estimated cost determined from the approximated cost-to-go function, $\hat{Z}_{avg}{}^{i}$ is an estimated average cost in state i, and $\hat{Z}_{avg}{}^{i+1}$ is an estimated average cost in state i+1.

6. The method of claim 3, wherein passively-collected data is the only data used during updating of the critic network parameters.

7. A computer-implemented method of adaptively controlling an autonomous operation of a vehicle, the method comprising:
   a) in a critic network in a computing system configured to autonomously control the vehicle, determining, using samples of passively collected data and a state cost, an estimated average cost, and an approximated cost-to-go function that produces a minimum value for a cost-to-go of the vehicle when applied by an actor network; and
   b) in an actor network in the computing system and operatively coupled to the critic network, determining a control input to apply to the vehicle which produces the minimum value for the cost-to-go,
   wherein the actor network is configured to determine the control input by estimating a noise level using the estimated average cost, an estimated cost-to-go determined from the approximated cost-to-go function, a control dynamics for a current state of the vehicle, and the samples of passively collected data,
   the method further comprising the step of updating parameters of the critic network using an approximated temporal difference error determined in accordance with the following relationship:

$$e_k := \hat{Z}_{avg} \hat{Z}_k - \exp(-q_k) \hat{Z}_{k+1}$$

where $e_k$ is the approximated temporal difference error, $\hat{Z}_{avg}$ is an estimated average cost, $\hat{Z}_k$ is an estimated cost-to-go in a state k, $\hat{Z}_{k+1}$ is an estimated cost-to-go in a state k+1, and $q_k$ is a state cost in the state k.

8. The method of claim 1, wherein the approximated cost-to-go function is learned by the critic network in real time.

9. A computer-implemented method of adaptively controlling an autonomous operation of a vehicle, the method comprising:
   a) in a critic network in a computing system configured to autonomously control the vehicle, determining, using samples of passively collected data and a state cost, an estimated average cost, and an approximated cost-to-go function that produces a minimum value for a cost-to-go of the vehicle when applied by an actor network; and
   b) in an actor network in the computing system and operatively coupled to the critic network, determining a control input to apply to the vehicle which produces the minimum value for the cost-to-go,
   wherein the actor network is configured to determine the control input by estimating a noise level using the estimated average cost, an estimated cost-to-go determined from the approximated cost-to-go function, a control dynamics for a current state of the vehicle, and the samples of passively collected data, and
   wherein the noise level is learned using a linear combination of weighted basis functions in accordance with the relationship:

$$\rho(x; \mu) \approx \tilde{\rho}(x; \mu) := \sum_{j}^{M} \mu_j g_j(x)$$

where ρ is an estimated noise level, $\mu_j$ is a weight for a j-th radial basis function denoted by $g_j$, and M is a number of radial basis functions to be used for estimating the noise level.

10. The method of claim 9 further comprising the step of updating a weight parameter of the actor network using an approximated error determined in accordance with the following relationship:

$$d_k \approx q_k \Delta t - \hat{V}_{k+1} + \hat{V}_{avg} + L_{k,k+1} \rho_k,$$

where $d_k$ is the approximated error, $q_k$ is a state cost in state k, $\hat{V}_k$ is an approximated cost-to-go in state k, $\hat{V}_{k+1}$ is an approximated cost-to-go in state k+1, $\hat{V}_{avg}$ is an approximated average cost, and $$L_{k,k+1} := (0.5 \hat{V}_k - \hat{V}_{k+1})^\tau B_k B_k{}^\tau \hat{V}_k \Delta t$$

where $B_k$ is a control dynamics in state k.

11. The method of claim 10 wherein updating of the actor network weight parameter is performed when the vehicle is in motion.

12. The method of claim 10 wherein a weight parameter of the actor network is updated in accordance with the following relationship:

$$\mu^{i+1} = \mu^{i} - \beta^{i} d_k L_{k,k+1} g_k,$$

where $\mu^{i+1}$ is a value of the weight parameter in a state i+1, $\mu^{i}$ is the value of the weight parameter in a state i, $\beta^{i}$ is a learning rate, $d_k$ is a temporal difference error, and g is a radial basis function.

13. The method of claim 1 further comprising the step of, using the control input, revising a control policy usable for controlling the autonomous operation.

14. The method of claim 1 further comprising the step of optimizing a control policy usable for controlling the autonomous operation by iteratively performing steps (a) and (b) to redetermine the control input until convergence of the estimated average cost.

15. The method of claim 14 wherein the control policy is optimized without active exploration.

16. A computing system configured for adaptively controlling an autonomous operation of a vehicle, the computing system comprising one or more processors for controlling operation of the computing system, and a memory for storing data and program instructions usable by the one or more processors, wherein the one or more processors are configured to execute instructions stored in the memory to:
   a) determine, using samples of passively collected data and a state cost, an estimated average cost, and an approximated cost-to-go function that produces a minimum value for a cost-to-go of the vehicle; and
   b) determine a control input to apply to the vehicle that produces the minimum value for the cost-to-go, wherein the one or more processors are configured to determine the control input by estimating a noise level using the estimated average cost, a cost-to-go determined from the approximated cost-to-go function, a control dynamics for a current state of the vehicle, and the samples of passively collected data,
   wherein the approximated cost-to-go function is determined using a linear combination of weighted radial basis functions in accordance with the following relationship:

$$\hat{Z}(x) := \sum_{j=0}^{N} \omega_j f_j(x)$$

where ω are weights, $f_j$ are j-th radial basis functions, N is a number of radial basis functions used for determining the approximated the cost-to-go function, and $\hat{Z}(x)$ is the-approximated cost-to-go function.

17. The computing system of claim 16 wherein the one or more processors are configured to execute instructions stored in the memory to optimize a control policy usable for controlling the autonomous operation by iteratively repeating steps (a) and (b) to redetermine the control input until convergence of the estimated average cost.

18. A non-transitory computer readable medium having stored therein instructions executable by a computer system to cause the computer system to perform functions, the functions comprising:
   a) determining, using samples of passively collected data and a state cost, an estimated average cost, and an approximated cost-to-go function that produces a minimum value for a cost-to-go of a vehicle; and
   b) determining a control input to apply to the vehicle to control an autonomous operation of the vehicle, wherein the control input produces the minimum value for the cost-to-go, and wherein the control input is determined by estimating a noise level using the average cost, a cost-to-go determined from the approximated cost-to-go function, a control dynamics for a current state of the vehicle, and the samples of passively collected data,
wherein the approximated cost-to-go function is determined using a linear combination of weighted radial basis functions in accordance with the following relationship:

$$\hat{Z}(x) := \sum_{j=0}^{N} \omega_j f_j(x)$$

where ω are weights, $f_j$ are j-th radial basis functions, N is a number of radial basis functions used for determining the approximated the cost-to-go function, and $\hat{Z}(x)$ is the-approximated cost-to-go function.

19. The non-transitory computer readable medium of claim 18 wherein the instructions are executable to optimize a control policy usable for controlling the autonomous operation by iteratively repeating steps (a) and (b) to redetermine the control input until convergence of the estimated average cost.

* * * * *

UNITED STATES PATENT AND TRADEMARK OFFICE
CERTIFICATE OF CORRECTION

| | | |
|---|---|---|
| PATENT NO. | : 10,065,654 B2 | Page 1 of 1 |
| APPLICATION NO. | : 15/205558 | |
| DATED | : September 4, 2018 | |
| INVENTOR(S) | : Tomoki Nishi | |

It is certified that error appears in the above-identified patent and that said Letters Patent is hereby corrected as shown below:

In the Specification

Column 10, Line 22 should read:

$$-- \hat{V}(\mathbf{x}_{k+1} + B_k \mathbf{u}_k \Delta t) \approx \hat{V}_{k+1} + \hat{V}_{x_{k+1}}^T B_k \mathbf{u}_k \Delta t. --$$

Column 10, Line 26:
Delete:
"$\mu^{i+1} = \mu^i - \beta d_k L_{k,k+1} g_k$,"
And insert:
--$\mu^{i+1} = \mu^i - \beta^i d_k L_{k,k+1} g_k$,--

Signed and Sealed this
Eighteenth Day of February, 2020

Andrei Iancu
*Director of the United States Patent and Trademark Office*